United States Patent
Flege et al.

(10) Patent No.: US 7,095,839 B2
(45) Date of Patent: Aug. 22, 2006

(54) SWITCHING SYSTEM WITH SEPARATE CONTROL CONNECTION TO REMOTE BRANCH EXCHANGES

(75) Inventors: Ernst Flege, Vienna (AT); Manfred Pignitter, Vienna (AT)

(73) Assignee: Ericsson Austria GmbH, Vienna (AT)

( * ) Notice: Subject to any disclaimer, the term of this patent is extended or adjusted under 35 U.S.C. 154(b) by 0 days.

(21) Appl. No.: 10/500,637

(22) PCT Filed: Dec. 19, 2002

(86) PCT No.: PCT/AT02/00358

§ 371 (c)(1),
(2), (4) Date: Jul. 2, 2004

(87) PCT Pub. No.: WO03/061255

PCT Pub. Date: Jul. 24, 2003

(65) Prior Publication Data

US 2005/0041791 A1    Feb. 24, 2005

(30) Foreign Application Priority Data

Jan. 2, 2002    (AT) .................................. A 8/2002

(51) Int. Cl.
*H04M 3/00* (2006.01)

(52) U.S. Cl. ................. 379/265.02; 379/231; 379/233; 379/265.09

(58) Field of Classification Search ............. 379/90.01, 379/210.01, 265.02, 265.09, 265.11, 266.04, 379/231, 233, 234
See application file for complete search history.

(56) References Cited

U.S. PATENT DOCUMENTS 5,937,051 A    8/1999 Maloney et al.
6,130,933 A *  10/2000 Miloslavsky ............. 379/90.01
6,181,788 B1   1/2001 Miloslavsky
6,345,091 B1 * 2/2002 Vernooij et al. ............ 379/225
6,373,836 B1 * 4/2002 Deryugin et al. ........... 370/352
6,442,256 B1 * 8/2002 Garland et al. ........ 379/106.09
6,668,286 B1 * 12/2003 Bateman et al. ............... 710/6

FOREIGN PATENT DOCUMENTS

| EP | 0 802 665 | 10/1997 |
| WO | 98/01987 | 1/1998 |
| WO | 98/31130 | 7/1998 |
| WO | 00/60880 A | 10/2000 |

OTHER PUBLICATIONS

Anonymous; "BT Featurenet Embark Service Description"; www1.btwebworld.com/sinet, Jul. 30, 2001, Seiten 1-14, XP002237911.
Anonymous; "BT Featurenet Embark Service Description"; www1.btwebworld.com/sinet, Jul. 30, 2001, Seiten 1-14, XP002237911.
International Search Report.
Australian Search Report.

* cited by examiner

*Primary Examiner*—Bing Q. Bui

(74) *Attorney, Agent, or Firm*—Nixon & Vanderhye, P.C.

(57) ABSTRACT

Disclosed is a telecommunication switching system for switching incoming and/or outgoing calls with several or different branch exchanges, comprising at least one input channel and at least one output channel which is connected to a branch exchange. The output channel provides both a voice connection and a control connection giving direct access to the operator-relevant PBX functionality of the branch exchange which is connected via the output channel.

16 Claims, 4 Drawing Sheets

SWITCHING SYSTEM WITH SEPARATE CONTROL CONNECTION TO REMOTE BRANCH EXCHANGES

This application is the US national phase of international application PCT/AT02/00358 filed in English on 19 Dec. 2002, which designated the US. PCT/AT02/00358 claims priority to AT Application No. A 8/2002 filed 01 Jan. 2002. The entire contents of these applications are incorporated herein by reference.

The invention relates to a switching system in telecommunications for switching incoming and/or outgoing calls with one or several PBX systems, comprising at least one input channel and at least one output channel connectable to a PBX.

Such switching systems, especially call centers, have long been known in the state of the art.

Private telephone networks have been used in addition which can also be composed of a plurality of extensions. BT Suppliers Information Note of June 2001 in BT FeatureNet Embark Service Description offers a virtual private telephone network in which several differently large PBX systems are networked, which are connected either via digital DPNSS lines or standard phone lines (Centrex) with the private network. This system allows calls within this network with a private call number scheme, but also to the public telephone network by using the generally valid phone numbers. One output channel between a PBX system and the FeatureNet-Embark system is realized via a 2 Mbit/s DPNSS connection, through which more than 5,000 extension calls can be processed. A table in this publication shows a centralized operator and several operator functions.

Call centers on the other hand are used in businesses, in banking and insurance, in support and many other fields where phone support, consultation or sales are possible. Call centers are the first point of contact for inquiries, information, orders, etc. for one or several firms. Call centers usually provide their services for several firms simultaneously. The call center accepts all callers of an information hotline. A large number of questions of the callers can already be answered by employees in the call center. In addition to the advantage that usually nearly all customer wishes can be fulfilled in the call center directly, call centers have serious disadvantages concerning the transfer of incoming calls to special contacts or employees of the company. A conversation, when transferred, will remain outside of the control of the call center. Moreover, it is only possible to transfer calls. The employees of the call center have no overview or control over which extensions are free or engaged. Generally, no functions of conventional PBX systems are available. The individual positions of the call centers (the call center positions) are not integrated in the firm or its PBX system; there is merely a voice connection via PSTN to this company.

These additional service features were accessible in the current state of the art only for call transfers within phone or PBX systems. Call transfers were made up until now within the company or the business and it was necessary to set up a special position for the transfers. The PBX attendant's position often defines the company's outside appearance and should therefore be manned by respectively well-trained staff. It is often difficult for companies to obtain respectively well-trained staff. Moreover, the call transfer service should always be available during the business hours, which is why holiday seasons regularly lead to problems.

It is the object of the present invention to provide a switching system of the kind mentioned above which eliminates the described disadvantages and allows, among other things, that call centers can also access the PBX functionality of the PBX systems of the companies that are served by the call center. It is a further object of the invention to provide a switching system that can centrally assume the switching function of one or several PBX systems and will thus allow companies to outsource their switching services. Finally, it is the object of the invention to provide a switching system that can provide the switching function for PBX systems of different designs.

This is achieved in accordance with the invention that the output channel provides both a voice connection as well as a control connection. In this way it is possible to transmit, in addition to the known transfer of the calls, control information from and to the PBX system, with the control connection allowing direct access to the operator-relevant PBX functionality of the PBX system connected via the output channel.

According to a further variant of the invention it can be provided that the control connection occurs via a CTI link which is configured for a CTI protocol provided by the PBX system. The control connection thus allows the computer support of all telephony services of the PBX system.

In a further embodiment of the invention it can be provided that the switching system comprises an operator's position providing operator functions which allow access to the PBX system, especially the transfer of calls to individual extensions of the PBX system, as well as enquiry calls or busy override. The control connection or the CTI link ensure that the system has access to the control functions of the switching system. The system is thus allowed to see whether the desired subscriber is engaged or free, which is an example for an operator-relevant function. This is not possible in conventional call centers. Calls can also be retrieved if the desired subscriber does not pick up the phone. Moreover, it is possible to offer phone functions from the outside such as callback when engaged and service features of the respective customer PBX system. All switching functions of the respective customer PBX system can also be triggered externally. All told, this allows positioning the operator's position outside of the company and to outsource the task of switching. As a result of the central switching service in the switching system, an operator's position in the individual PBX systems is no longer required.

According to another further development of the invention it can be provided that the switching system comprises at least one translation unit which translates the operator function into the CTI protocol of the PBX system to be connected. As a result, the CTI application of the switching system comes with the ability to access a large variety of PBX systems, especially the PBX systems of different makers. Different PBX systems and not only PBX systems of the same manufacturer or a company using the same CTI API or protocol can cooperate with the switching system. The switching system can thus act as an outsourced PBX system for several customers with a large variety of PBX systems. As a result of the full access to the respective customer PBX system it is thus possible to use operator-relevant functions such as callback, busy-flash display, conference system, series calls or messaging functions in this system. The external operator position sees precisely the status of all extensions and can offer professional switching service.

It can be provided in a further development of the invention that the switching system comprises several operator positions. The incoming calls can thus be distributed among several operators which work virtually like one operator. This is advantageous in companies with a large number of calls to be processed.

According to another variant of the invention it can be provided that the switching system provides call center functions, especially for dividing the incoming calls among the individual operator positions. These known call center functions such as ACD or IVR allow the optimal and most efficient distribution of the calls among the individual operator positions, so that the waiting periods for the callers can be minimized in total.

In a further embodiment of the invention it can be provided that the voice connection occurs in an analog way, especially via PSTN. The switching system can thus be used via conventional PBX systems.

According to a further embodiment of the invention it can be provided that the voice connection occurs in a digital way, especially via ISDN. This allows providing additional digital services by the PBX system.

The invention further relates to a method for switching incoming and/or outgoing calls of at least one PBX system. The known methods come with the aforementioned disadvantages, especially the disadvantage that switching functions cannot be outsourced. It is the object of the present invention to eliminate such disadvantages.

This is achieved in accordance with the invention that the calls are transferred to a central switching system which is connected to the PBX system via at least one voice connection and at least one control connection, and that the switching occurs through the central switching system, with the control connection allowing direct access to operator-relevant PBX functionality of the PBX system connected via the output channel. This allows central switching of the incoming and outgoing calls.

It can be provided for in a further embodiment of the invention that the control connection occurs through a CTI link which is configured for a CTI protocol provided by the PBX system. This allows offering computer-supported telephony services.

According to another variant of the invention it can be provided that the central switching system provides operator functions which allow access to service features of the PBX system, with the operator functions being translated by a translation unit into the CTI protocol of the PBX system. This allows communication with different PBX systems which do not have the same CTI protocol.

In accordance with a further embodiment of the invention it can be provided that the calls are transferred through an overload process depending on the load either to the local operator position of the PBX system or to the central switching system. The method in accordance with the invention allows reducing the dimension of local operator positions. Incoming calls can be switched within the PBX system by the local operator positions or, when they are not occupied or are overburdened, can be transferred to the central switching system.

The invention is now explained in closer detail by reference to the enclosed drawings which show especially advantageous embodiments, wherein.

Figure 1:
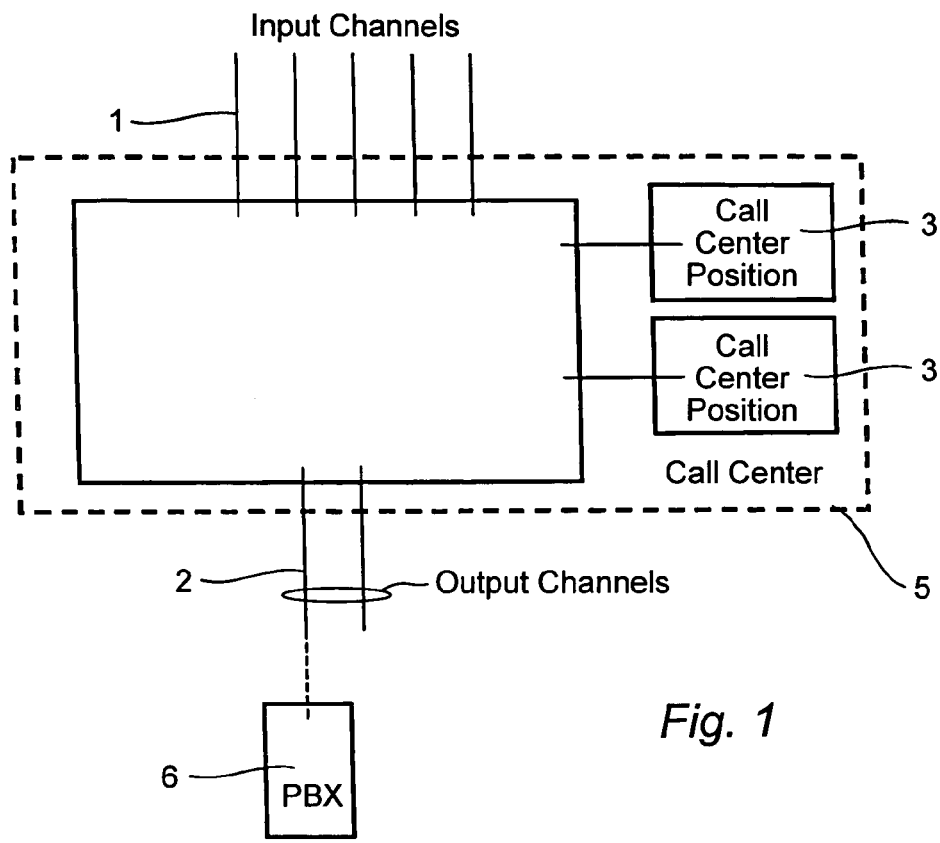
FIG. 1 shows the schematic configuration of a known call center 5.

FIG. 1 shows the schematic configuration of a call center 5. The relevant aspect is the presence of several input channels 1 and several call center positions 3. The incoming calls are automatically transferred to the call center positions 3, and received and processed by specially trained employees (so-called call center agents). In addition, the illustrated call center comprises several output channels 2 through which incoming calls can be transferred. In the case of so-called outbound call centers, a respectively high number of output channels 2 are provided which are used for direct marketing or for surveys, etc.

As already explained, the call center also allows transferring the callers with very special questions to an employee of the respective company. This transfer is a regular transfer to a PBX system 6 of the company. As a result, there is no possibility within the scope of known call center solutions to trace the further progress of the connected call. It is thus not possible to send a renewed query when the desired subscriber does not respond. Moreover, it is not possible to activate any service features such as busy override for example.

These additional service features are accessible in the state of the art only within phone or PBX systems 6. PBX systems 6 (private branch exchange) are switching systems to which one or several subscriber terminal devices or extensions 10 are connected via extension lines 8 and which are connected via one or several exclusive exchange lines or input/output channels 7 with the public telephone network.

Figure 2:
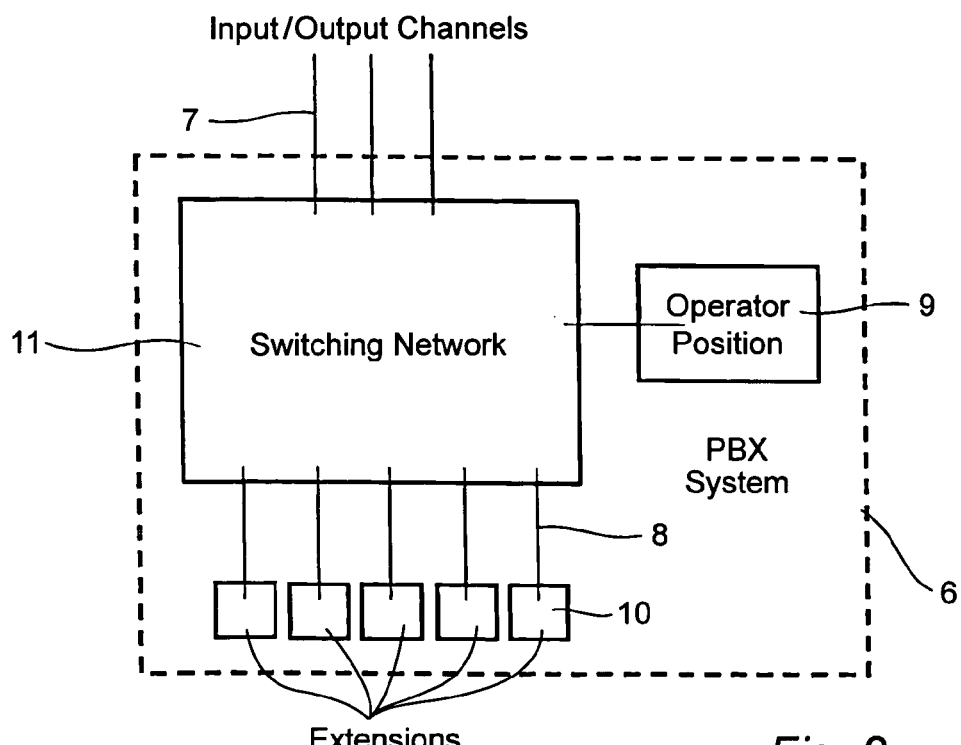
FIG. 2 shows the schematic configuration of a known PBX system 6.

FIG. 2 shows the schematic configuration of a typical PBX system 6, comprising several input/output channels 7 which can be connected via a switching network 11 and the extension lines 8 with the extensions 10. The PBX system 6 comprises an operator position 9 in the known manner.

The operator or attendant at the operator position 9 can connect calls to extensions 10 and monitor the status, retrieve calls when required and activate service functions.

Several PBX systems 6 can obviously be joined into a network. In this case an exchange is associated with each PBX system 6 of a network. This exchange per se can consist of one or several operator positions 9. The exchange can process call connections of the own PBX system 6 (i.e. the own node of the network), but not the switching of remote nodes or to different systems. The disadvantageous aspect in this known solution is also that an operator position 9 can cover only one company or PBX system 6 because it concerns a closed system with proprietary operating elements. Any external call centers 5 cannot access the PBX functionality of the PBX system 6. Although there are also networks of PBX systems 6 with central switching which can access all PBX systems 6, it is then necessary that all PBX systems use the same protocol.

The proposed solution offers a novel solution in order to outsource call switching of businesses. The system can be compared to the service of a call center, but it offers a complete integration in the customer's phone or PBX system 6. This means that the system is connected with the PBX system of all its customers.

Figure 3:
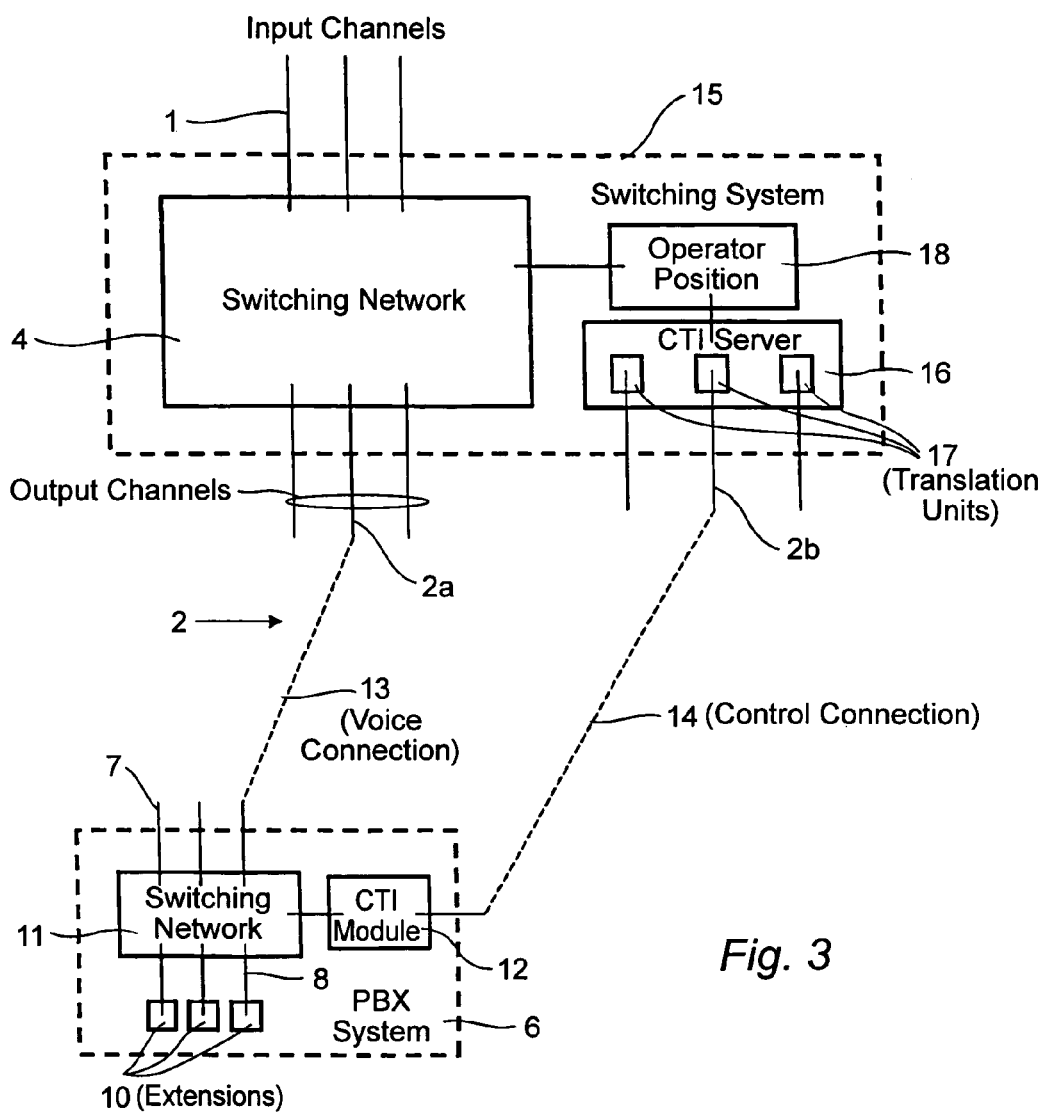
FIG. 3 shows the schematic configuration of a switching system 15 in accordance with the invention.

FIG. 3 shows a switching system 15 in accordance with the invention which allows the switching of incoming and/or outgoing calls with several or different PBX systems 6. The switching system 15 comprises several input channels 1 in the usual manner which can be connected via a switching network 4 with several output channels 2. The output channels 2 are indicated in FIG. 3 with an arrow and each comprise a channel 2a and a channel 2b. A channel 2a and a channel 2b each correspond to an output channel 2 in FIG. 1. The switching system 15 in accordance with the invention is connected via the output channel 2 or via the channels 2a, 2b with a PBX system 6, with the output channel 2 providing a voice connection 13 via channel 2a and a control connection 14 via the channel 2b.

Naturally it is also possible not to split the output channel 2 into two channels 2a and 2b (as shown in FIG. 3), but to provide both the voice connection 13 and the control connection 14 via the output channel 2, e.g. via frequency splitting.

The voice connection 13 between the switching system 15 and the PBX system 6 occurs in the known manner via a conventional PSTN connection for example. Other voice connections 13 are possible, especially via ISDN or mobile telephone radio service.

The call arriving on the input channel 1 can already have been transferred previously by another position, e.g. by the PBX system 6 itself, to said input channel 1. The relevant aspect in the method in accordance for the invention for switching incoming and/or outgoing calls from and to at least one PBX system 6 is that the calls are transferred to the central switching system 15 and that the switching occurs by the central switching system 15, with the same being connected with the PBX system 6 via at least one voice connection 13 and at least one control connection 14.

The control connection 14 allows direct access to the PBX functionality of the PBX system. In the configuration as shown in FIG. 3, the control connection 14 is provided via a CTI link. For this purpose the PBX system 6 comprises a CTI module 12 which provides CTI functions via a certain CTI protocol. The switching system 15 therefore accordingly comprises a CTI server 16 which is capable of the CTI protocol of the PBX system 6. The CTI connection ensures the transfer of the telephony functions.

Computer Telephony Integration (CTI) concerns generally the support of telephony services by computer technology. The application interface between PBX system and computer technology is determined by the API, i.e. by a documented software interface, with the help of which a program can use the functions of another program. Other control connections 14 are naturally also-possible which allow the access to the PBX system 6 via proprietary protocols for example.

The relevant aspect in the method according to the invention is merely that the control connection 14 is performed through a CTI link which is configured for a CTI protocol provided by the PBX system 6.

The control connection 14 allows the switching system 15 to provide operator functions at the operator position 18 which allow direct access to the PBX system 6. It can be monitored from the operator position 18 directly whether or not certain extensions 10 are engaged, calls can be retrieved, etc. The operator position 18 can be provided directly in the switching system 15; it is also possible that the switching system 15 allows the connection with an external operator position 18, e.g. via the internet. The relevant aspect is only that the operator functions are provided for access to the PBX system 6. This can be provided through a conventional PC operator software for example.

In order to enable the communication with different PBX systems 6 or via different CTI protocols, the switching system 15 comes with several translation units 17 which translate the operator functions into the CTI protocol of the PBX system 6 to be connected. The configuration of the system thus substantially consists of a powerful CTI application which offers CTI interfaces to several PBX systems.

The CTI application of the system offers the ability to access a larger variety of PBX systems by means of the CTI link.

Operator functions are provided in the switching process by the central switching system 15 which allow access to the service features of the PBX system 6, with the operator functions being translated by a translation unit 17 into the CTI protocol of the PBX system 6.

The described advantageous embodiment of the switching system 15 in accordance with the invention is thus characterized in that a central PC operator solution or a central operator position 18 is available in the switching system 15 which allows the switching for different PBX systems 6. The switching system 15 allows omitting any operator positions 9 at the level of the PBX systems 6 or allows reducing the dimension of such operator positions 9.

The central switching by the central operator position 18 can naturally be used both for switching incoming as well as outgoing calls for the connection of extensions 10 to the outside.

Figure 3A:
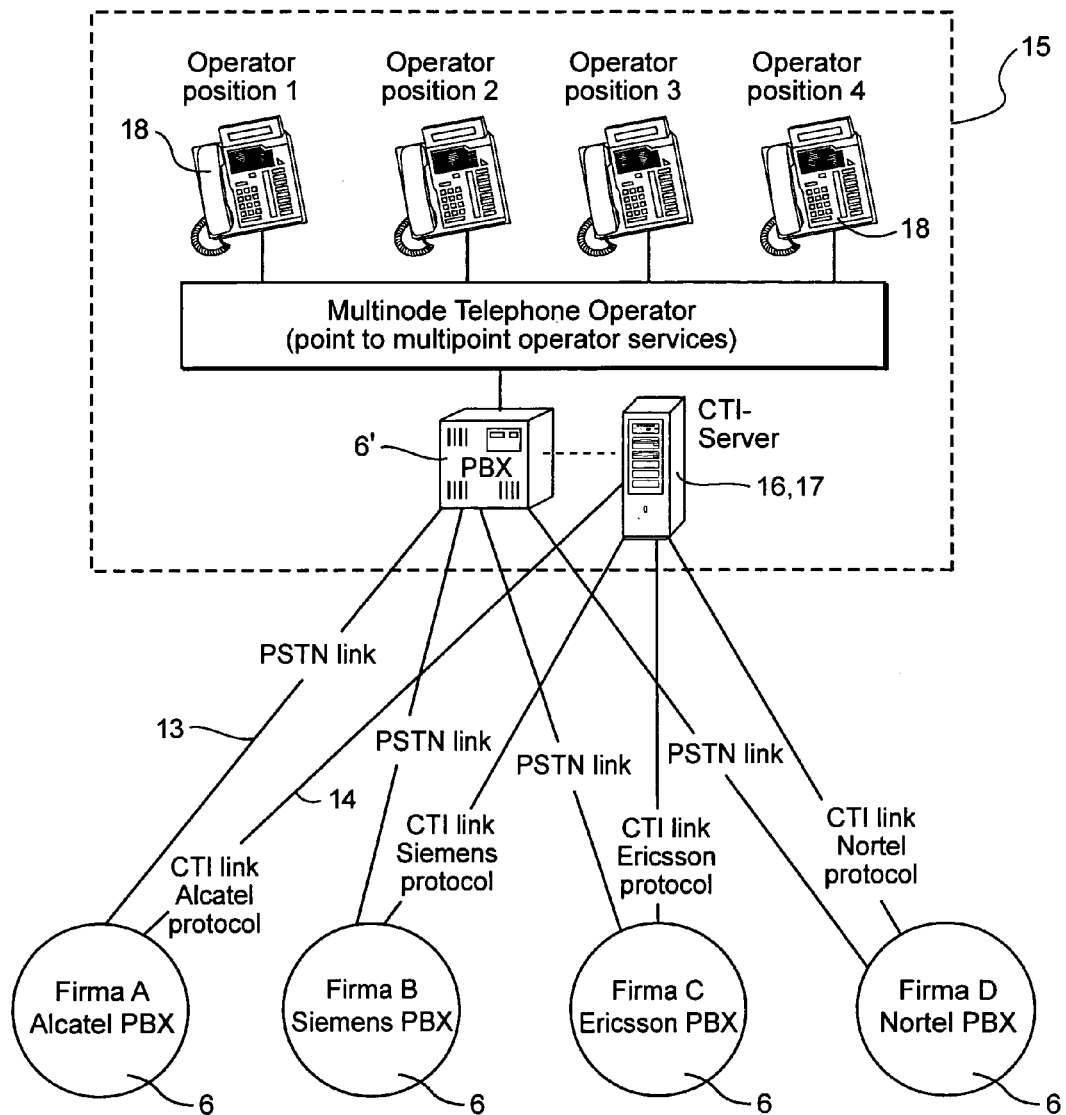
FIG. 3a shows a diagram of a further switching system 15 in accordance with the invention.

FIG. 3a shows a further embodiment of the invention, in which several operator positions 18 are provided. This allows large businesses or outsourced switching services to allocate the incoming calls to the operator positions 18. The switching system 15 comprises in this case its own PBX system 6' and an additional CTI server 16 which communicates with the same and which translates the CTI protocol of the switching system 15 with the help of suitable translation units 17 into the CTI protocols of the various PBX systems 6 which are connected with the switching system 15.

The illustrated switching system 15 offers a phone switching service for four different firms. Each of these firms has its own PBX system 6. The switching system connects to the respective customer system by means of CTI link. The relevant element lies in the intelligence of the CTI software of the system. This CTI software is on the one hand the regular PC operator solution, but also offers CTI links to the CTI protocols of a large variety of phone suppliers. This allows offering call control over several nodes (i.e. customers).

As compared with the known solutions, this system thus offers the advantage that the calls are under the control of the exchange even after the switching. Calls can be retrieved back to the exchange, which is an operator-relevant function for example. The system offers full control over the call status of extensions 10, with the PBX function being available in a transparent manner. The integrated functionality is only outsourced in a physical way. There is both a voice connection 13 and a computer telephony connection 14 with the customer PBX. A relevant advantage is that a PC operator function no longer needs to be implemented in the individual PBX systems 6. This function can be assumed by the central outsourced exchange.

An important field of application of the invention is the outward presentation of newly purchased businesses. A caller can be transferred via the central exchange of a group directly to employees of a previously purchased subsidiary, with the parent enterprise presenting itself under a single interface. The switching function is performed via the switching system 15 in accordance with the invention which transparently displays the connection to the PBX system 6 of the newly purchased firm.

Call center functions such as ACD or IVR are implemented in the switching system 15 with several operator positions 18 (as shown in FIG. 3a), which call center functions distribute the incoming calls among the individual operator positions. The automatic call distribution (ACD)

system transfers the incoming phone calls depending on the load and forwards the call to the next free operator position 18. As a rule, the longest inactive operator will receive the new phone inquiry. The Interactive Voice Response (IVR) system ensures that the customer is able to pre-structure his or her inquiry to such an extent so that the call center operators can specialize in certain tasks. The customer's wish can therefore be processed in more detail. For example, an interested customer chooses a certain product group and is transferred to the respective specialist.

It is understood that the switching system in accordance with the invention can be used for different phone systems such as PSTN, i.e. conventional international phone systems with analog transmission via copper cables in the frequency range of 300 Hz to 3.4 kHz, ISDN or FDDI.

Figure 4:
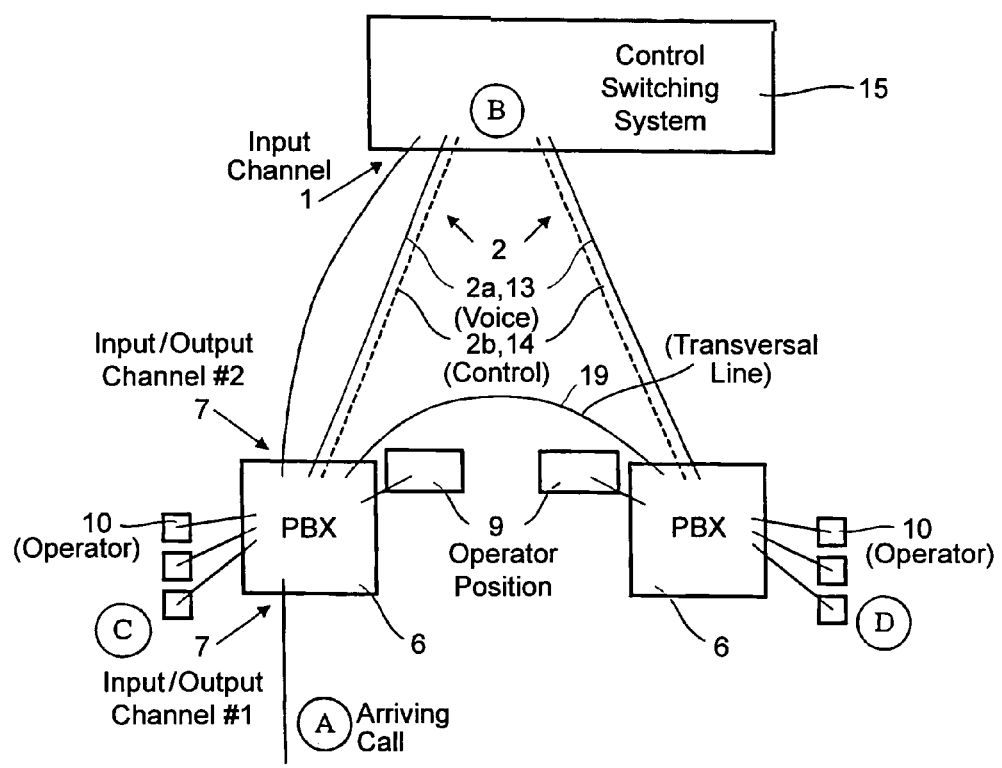
FIG. 4 shows a diagram of different possibilities for switching or transferring calls.

FIG. 4 shows different possibilities of switching or transferring incoming calls based on a switching system 15 in accordance with the invention with two connected PBX systems 6 with different CTI protocols. The illustrated PBX systems 6 each comprise an operator position 9, but are connected otherwise with the central switching system 15 via a voice connection 13 and a control connection 14 each.

The illustrated configuration allows for example that an incoming call arrives at the input/output channel 7 designated with A and is transferred to the central exchange 15. The question whether the call is transferred to the local operator position 9 or the central exchange can depend on various parameters. Preferably, the operator position 9 comprises an overload device, so that incoming calls will be transferred first to the operator position 9 and, only when calls are not processed within a reasonable period of time or when the operator position 9 is not manned, to the central switching system 15. Such overload processes such as the aforementioned ACD method are often used in call switching.

The method in accordance with the invention thus allows transferring the calls through an overload method depending on the load either to a local operator position 9 of the PBX system 6 or to the central switching system 15.

By providing the central switching system 15, the local operator positions 9 can be provided with a smaller dimensioning or can even be omitted entirely. In the example of FIG. 4, the call arriving at A is transferred at first via the second input/output channel 7 which is connected with the input channel 1 of the switching system 15 to the central switching system 15 which is additionally designated here with reference numeral B. The sought contact is situated at the extension 10 designated with C of the PBX system 6. Appropriately, the voice connection is not made from A via B and back to C but directly from A to C in the PBX system 6. For this purpose the voice connection within the PBX system 6 is established. The central exchange can still have control over the call via the control line 14. It can also be proceeded similarly when two PBX systems 6 are connected with each other via a transversal line 19 and the desired contact is situated at the extension 10 designated with D. In this case, the voice connection is performed from A to D via the transversal line 19 after the switching has occurred at B. The control over the control line 14 and the CTI link remains with the switching system 15 which can retrieve the call again and transfer it to another extension 10. In both cases the existing voice connections between the PBX systems 6 and the central switching system 15 are relieved.

FIG. 4 also shows that the input channels 1 and output channels 2 need not necessarily be exclusively available for incoming or outgoing calls. It may also occur that one and the same channel can be used for incoming and outgoing calls. The different designation is only used for clearer functional separation, but shall not limit the invention to any actually different input channels 1 or output channels 2.

The invention claimed is:

1. A switching system in telecommunications for switching incoming and/or outgoing calls with one or several PBX systems, comprising:
   at least one input channel and at least one output channel connectable between said switching system and a PBX system,
   wherein the output channel provides both a voice connection as well as a control connection, with the control connection allowing direct access to the operator-relevant PBX functionality of the PBX system connected via the output channel.

2. A switching system as claimed in claim 1, wherein the control connection is provided via a CTI link which is configured for a CTI protocol provided by the PBX system.

3. A switching system as claimed in claim 1, wherein the switching system comprises an operator position which provides operator functions which allow access to the service features of the PBX system, especially the switching of calls to the individual extensions of the PBX system as well as callback or busy override.

4. A switching system as claimed in claim 1, wherein the switching system comprises at least one translation unit which translates the operator functions into the CTI protocol of the respective PBX system to be connected.

5. A switching system as claimed in claim 1, wherein the switching system comprises several operator positions.

6. A switching system as claimed in claim 1, wherein the switching system provides call center functions, especially for distributing the incoming calls among the individual operator positions.

7. A switching system as claimed in claim 1, wherein the voice connection occurs in an analog way, especially via PSTN.

8. A switching system as claimed in claim 1, wherein the voice connection occurs in a digital way, especially via ISDN.

9. A switching system as claimed in claim 1, wherein the switching system is physically separate and remote from the PBX system.

10. A switching system as claimed in claim 1, wherein the switching system is configured to control call handling in the one or several PBX systems via the output channel.

11. A method for switching incoming and/or outgoing calls with at least one PBX system, wherein the calls are transferred to a central switching system which is connected to the PBX system via at least one voice connection and at least one control connection, and that the switching occurs through the central switching system, with the control connection allowing direct access to operator-relevant PBX functionality of the PBX system connected via the output channel.

12. A method as claimed in claim 11, wherein the control connection is provided via a CTI link which is configured for a CTI protocol provided by the PBX system.

13. A method as claimed in claim 12, wherein the central switching system provides operator functions which allow access to the service features of the PBX system, with the operator functions being translated by a translation unit into the CTI protocol of the PBX system.

14. A method as claimed in claim 11, wherein the calls are transferred by an overload method depending on the load either to a local operator position of the PBX system or to the central switching system.

15. A method as claimed in claim 11, wherein the central switching system is physically separate from the PBX system.

16. A method as claimed in claim 11, wherein the central switching system controls call handling in the PBX system so that a call center operator external to the PBX system can access PBX functionality of the PBX system via the central switching system and the control connection.

* * * * *